US012727710B2

(12) United States Patent
Hansen et al.

(10) Patent No.: US 12,727,710 B2
(45) **Date of Patent: *Sep. 8, 2026**

(54) LIQUID SENSING ARRANGEMENT FOR BEVERAGE MACHINE

(71) Applicant: Keurig Green Mountain, Inc., Burlington, MA (US)

(72) Inventors: Matthew Martin Kenneth Hansen, Cambridge, MA (US); Tao Xu, Shenzhen (CN); Guozhuang Zeng, Shenzhen (CN); Edward Anthony Mello, III, Shrewsbury, MA (US); Jianming Huang, Andover, MA (US); Daniel Stuart Burke, Beverly, MA (US)

(73) Assignee: Keurig Green Mountain, Inc., Burlington, MA (US)

(*) Notice: Subject to any disclaimer, the term of this patent is extended or adjusted under 35 U.S.C. 154(b) by 1053 days.

This patent is subject to a terminal disclaimer.

(21) Appl. No.: 17/730,275

(22) Filed: Apr. 27, 2022

(65) Prior Publication Data

US 2022/0322867 A1 Oct. 13, 2022

Related U.S. Application Data

(63) Continuation-in-part of application No. PCT/US2021/056613, filed on Oct. 26, 2021, and a
(Continued)

(51) Int. Cl.
*A47J 31/52* (2006.01)
*A47J 31/46* (2006.01)
(Continued)

(52) U.S. Cl.
CPC .......... *A47J 31/525* (2018.08); *A47J 31/468* (2018.08); *A47J 31/56* (2013.01); *G01F 23/2921* (2013.01)

(58) Field of Classification Search
CPC ........ A47J 31/545; A47J 31/468; A47J 31/56; A47J 31/525; A47J 31/46; A47J 31/02;
(Continued)

(56) References Cited

U.S. PATENT DOCUMENTS 2,980,802 A 4/1961 Bracey et al.
5,369,398 A 11/1994 Vancha
(Continued)

FOREIGN PATENT DOCUMENTS

CN 1593311 A 3/2005
CN 101208256 A 6/2008
(Continued)

*Primary Examiner* — Phuong T Nguyen
(74) *Attorney, Agent, or Firm* — Wolf, Greenfield & Sacks, P.C.

(57) ABSTRACT

Methods and systems for employing a sensor to detect disconnection of a liquid supply tank and/or a low fill level of the liquid supply tank are disclosed herein. The sensor may have an optical sensor to detect liquid, e.g., to detect a liquid level in a removable liquid supply tank and/or liquid at a pump. The optical sensor can include a body made of a resilient material and including first and second portions and an opening located between the first and second portions. The opening can be configured to receive and frictionally engage with a conduit for carrying liquid, with the first portion configured to support a light emitter and the second portion configured to support a light detector.

18 Claims, 7 Drawing Sheets

Related U.S. Application Data continuation-in-part of application No. PCT/US2021/056645, filed on Oct. 26, 2021.

(60) Provisional application No. 63/106,795, filed on Oct. 28, 2020, provisional application No. 63/106,585, filed on Oct. 28, 2020.

(51) Int. Cl.
*A47J 31/56* (2006.01)
*G01F 23/292* (2006.01)

(58) Field of Classification Search
CPC .... A47J 31/4482; A47J 31/4485; A47J 31/60; A47J 31/469; A47J 31/061; A47J 45/10; A47J 36/10; A47J 31/38; A47J 31/461; A47J 31/005; A47J 31/0663; A47J 31/0684; A47J 31/3671; A47J 31/446; G01F 23/2921; G01F 23/804
USPC .......................... 99/287, 279, 290, 293, 295
See application file for complete search history.

(56) References Cited

U.S. PATENT DOCUMENTS

| | | | | |
|---|---|---|---|---|
| 5,388,501 | A | 2/1995 | Hazan et al. | |
| 6,941,856 | B2 * | 9/2005 | Font | A47J 31/0573 99/280 |
| 2006/0288776 | A1 * | 12/2006 | Pelovitz | G01F 23/241 73/304 C |
| 2009/0031901 | A1 * | 2/2009 | Peden | B67D 1/0888 222/64 |
| 2012/0123325 | A1 * | 5/2012 | Kameyama | A61M 5/16886 604/151 |
| 2013/0209636 | A1 * | 8/2013 | Cominelli | A47J 31/46 99/301 |
| 2015/0129039 | A1 * | 5/2015 | Mulvaney | A47J 31/057 99/280 |
| 2016/0235246 | A1 * | 8/2016 | Beekman | A47J 31/4403 |
| 2017/0188745 | A1 | 7/2017 | Mitchell et al. | |
| 2017/0290458 | A1 | 10/2017 | Burrows | |
| 2017/0295990 | A1 | 10/2017 | Van Der Woning et al. | |
| 2018/0306831 | A1 * | 10/2018 | Hatamian | A61B 5/02 |
| 2019/0060857 | A1 * | 2/2019 | Tincher | G01F 23/2921 |
| 2019/0389716 | A1 | 12/2019 | O'Brien | |
| 2021/0235918 | A1 * | 8/2021 | Chen | A23F 5/26 |
| 2023/0397755 | A1 | 12/2023 | Geng et al. | |
| 2024/0016335 | A1 | 1/2024 | Mikkelsen et al. | |

FOREIGN PATENT DOCUMENTS

| | | | | |
|---|---|---|---|---|
| CN | 101283239 | A | 10/2008 | |
| CN | 201411171 | Y | 2/2010 | |
| CN | 104291032 | A | 1/2015 | |
| CN | 104582547 | A | 4/2015 | |
| CN | 106510460 | A * | 3/2017 | A47J 31/605 |
| CN | 106802173 | A | 6/2017 | |
| CN | 110200502 | A * | 9/2019 | A47J 31/56 |
| CN | 110500502 | A | 11/2019 | |
| EP | 0 690 234 | A2 | 1/1996 | |
| EP | 1 514 500 | A1 | 3/2005 | |
| EP | 1722204 | A1 * | 11/2006 | A47J 31/4457 |
| EP | 2 409 612 | B1 | 1/2013 | |
| EP | 2 702 908 | A1 | 3/2014 | |
| GB | 2 469 874 | A | 11/2010 | |
| JP | 2002-192055 | A | 7/2002 | |
| WO | WO 2016/189800 | A1 | 12/2016 | |

* cited by examiner

LIQUID SENSING ARRANGEMENT FOR BEVERAGE MACHINE

RELATED APPLICATIONS

This application is a continuation in part of International Application No. PCT/US2021/056645, filed Oct. 26, 2021, which claims the benefit of U.S. Provisional Application No. 63/106,585, filed Oct. 28, 2020. This application is also a continuation in part of International Application No. PCT/US2021/056613, filed Oct. 26, 2021, which claims the benefit of U.S. Provisional Application No. 63/106,795, filed Oct. 28, 2020. These applications are hereby incorporated by reference in their entireties.

FIELD

This disclosure relates to beverage machines, such as coffee brewers that use a liquid to form a coffee beverage.

BACKGROUND

Beverage machines frequently employ a level sensor to detect a liquid fill level of a liquid supply tank, e.g., to help ensure that there is sufficient liquid in the liquid supply tank for a beverage cycle. As an example, some coffee brewers use a level sensor positioned to contact liquid in the liquid supply tank to detect the fill level of the tank, and to control a beverage cycle accordingly.

SUMMARY

Level sensors used to detect liquid fill level of a liquid supply tank are typically positioned in the liquid supply tank itself. This positioning helps the level sensor obtain a direct measurement of the liquid level in the liquid supply tank. For example, some coffee machines employ a floating element in a liquid supply tank that moves with changing water level in the tank. A sensor outside of the tank can detect the location of the floating element, and thus information regarding a liquid level in the tank.

The inventor(s) have appreciated that in some cases, it is desirable to position a sensor outside of a liquid supply tank to detect tank fill level. Such positioning can allow the liquid supply tank to be disconnected and removed from the beverage machine, e.g., for ease of refill of the tank, without needing an arrangement that also allows for disconnection and reconnection of a level sensor. The inventor(s) have also appreciated that a sensor positioned outside of a liquid supply tank can be used to detect a low fill level of the tank and/or a disconnection of the tank or other condition in which water is not provided to the machine. In some cases, the beverage machine can detect that the liquid supply tank has been removed or liquid supply otherwise stopped without needing an additional sensor that is specifically dedicated to detecting presence or absence of the liquid supply tank.

In some embodiments of this disclosure, a sensor may be configured to detect both disconnection of a liquid supply tank, and when a liquid fill level of the liquid supply tank is below a threshold level, e.g., too low to complete formation of a beverage. The sensor may be configured to detect a presence and/or absence of liquid in a conduit that is in fluid communication with the liquid supply tank. The sensor detecting an absence of liquid in the conduit may be indicative of either the liquid supply tank being disconnected, or a liquid fill level in the liquid supply tank being below a threshold level. The sensor may be positioned in a liquid supply line, or in a conduit that is in fluid communication with the liquid supply tank, but is separate and distinct from the liquid supply line.

According to one aspect, a beverage machine is provided. The beverage machine may include a liquid supply tank configured to hold a liquid for forming a beverage. The beverage machine may also include a conduit that is fluidly coupled to the liquid supply tank and positioned such that, for at least some fill levels of the liquid supply tank, prior to initiation of a beverage cycle, a liquid level in the conduit corresponds to a liquid level in the liquid supply tank. The beverage machine may also include a sensor such as a conductive probe or optical sensor positioned within the conduit and at a level in the conduit to detect presence and absence of liquid at the level in the conduit. The level can be located at a vertical height that is between a bottom of the liquid supply tank and a maximum fill level of the liquid supply tank, e.g., so the sensor can detect whether a liquid level in the tank is above or below the level at which the sensor detects the presence/absence of liquid.

In some embodiments, a beverage machine may include a liquid supply tank configured to hold a liquid for forming a beverage. The beverage machine may also include a pump fluidly coupled to the liquid supply tank. The beverage machine may also include a liquid supply line configured to provide liquid from the liquid supply tank to the pump. The beverage machine may also include a vent fluidly coupled to the liquid supply line to vent at least a portion of the liquid supply line to ambient pressure such that, for at least some fill levels of the liquid supply tank, a liquid level in the liquid supply line is at a same height as a liquid level in the liquid supply tank. The beverage machine may also include a sensor configured to detect presence and absence of liquid in the liquid supply line.

In some embodiments, a beverage machine may include a liquid supply tank configured to hold a liquid for forming a beverage, the liquid supply tank having a disconnected state and a connected state. The beverage machine may include a conduit that is external to and fluidly coupled to the liquid supply tank when the liquid supply tank is in the connected state. The beverage machine may include a sensor configured to detect presence and absence of liquid at a level in the conduit in order to detect disconnection of the liquid supply tank and to detect that a liquid level in the liquid supply tank is below a threshold level.

In some embodiments, an optical sensor arrangement includes a body made of a resilient material, such as a silicone rubber, that has first and second portions and an opening located between the first and second portions. The opening can be configured to receive and frictionally engage with a conduit for carrying liquid. For example, a silicone rubber tube or other conduit (e.g., rigid or flexible) can be inserted into the opening and engaged by the body. In some cases, the body and the opening can be configured to frictionally engage with the conduit, e.g., so that the body supports itself and associated components on the conduit. In some cases, the first portion of the body can be configured to support a light emitter to emit light toward the opening and through a conduit engaged at the opening. For example, a light emitter such as an LED component can be inserted into a hole formed in the first portion and frictionally engaged by the first portion so the light emitter is supported on the body and oriented to emit light toward the opening. The light emitter can be arranged to emit light toward the opening in any suitable way, such as in a direction perpendicular to a conduit engaged at the body opening and/or in a direction to pass through a lumen of a conduit engaged at the opening. The second portion can be configured to support a light detector to detect light transmitted by the light emitter toward the opening. For example, light emitted by the light emitter at the first portion can pass through the opening (and any conduit engaged at the body opening) to be detected by the light detector at the second portion. The light detector can be supported by the second portion in a way similar to that for the first portion and light emitter, e.g., the light detector can be inserted into a hole in the second portion and frictionally engaged so the light detector is supported by the second portion to detect light from the opening.

In some cases, the first and second portions can be configured to frictionally engage with the light emitter and light detector, respectively, such that optical axes of the light emitter and light detector are aligned with each other. For example, the first and second portions can support the light emitter and detector so that optical axes of the light emitter and detector can be coaxial and/or parallel and can pass through at least a portion of a conduit engaged at the body opening. In some embodiments, the first and second portions can be configured to emit and detect light that is oriented perpendicular to a conduit received by the opening.

In some embodiments, one of the first and second portions can be configured to filter light emitted by the light emitter. For example, light emitted by a light emitter supported by the first portion can pass through a part of the first portion and/or another element (such as a filter or other optical element) supported by the first portion on a light path to the opening and a conduit engaged at the opening. Alternately, or in addition, light from the opening can pass through a part of the second portion and/or another element (such as a filter or other optical element) supported by the second portion on a light path to the light detector. Thus, a part of the first and/or second portions can operate as an optical element to filter, focus, reflect, refract, attenuate or otherwise operate on light transmitted toward and/or from the opening.

In some cases, the body can be configured as an elongated rod with the first and second portions at opposite ends of the rod and the opening near a center of the rod. For example, the body can have an elongated rectangular shape that has a length greater than either width dimension. The opening can pass through a center of the rod between the two ends, which can form the first and second portions. As an example, the opening can be oriented so as to be perpendicular to one of the faces of the body. In some cases, the first and second portions can each include a hole that extends from respective ends of the rod into the body and toward the opening. For example, the holes can extend into the body along a longitudinal axis of an elongated rod shape of the body. The hole for each of the first and second portions can be configured to receive and frictionally engage with the light emitter and light detector, respectively. The resilient nature of the body can help align the light emitter and detector suitably with respect to the opening and any conduit engaged at the opening, e.g., so that the optical axes of the emitter and detector are suitably configured to detect liquid presence or absence in the conduit.

In some embodiments, a beverage machine includes a liquid supply tank configured to hold a liquid for forming a beverage, a heater configured to heat the liquid from the liquid supply tank, a first conduit fluidly coupled to the liquid supply tank, and a second conduit fluidly coupled to and upstream of the heater and downstream of the first conduit. A pump can be fluidly coupled between the first and second conduits, and a first sensor (such as a conductive probe sensor) can be configured to detect liquid in the first conduit. In some cases, the first sensor can be configured to detect presence and absence of liquid at a level in the first conduit, and the level can be located at a vertical height that is between a bottom of the liquid supply tank and a maximum fill level of the liquid supply tank. In some embodiments, the first conduit can be configured such that, for at least some fill levels of the liquid supply tank, prior to initiation of a beverage cycle, a liquid level in the first conduit corresponds to a liquid level in the liquid supply tank. An optical sensor can be configured to detect liquid in the second conduit, e.g., to determine whether the pump is moving air and/or liquid. The optical sensor can be configured in any suitable way, including those arrangements described herein.

In some cases, the first conduit can be configured to deliver liquid from the liquid supply tank to the second conduit, e.g., the first conduit can extend from an outlet of the supply tank to the inlet of the pump. In some cases, a third conduit can be configured to deliver liquid from the liquid supply tank to the second conduit, and the first conduit can be fluidly coupled to the third conduit and be separate and distinct from the third conduit. As an example, the first conduit can be configured as a manometer or other fluid path that is coupled to the third conduit and the liquid supply tank but does not conduct flow of fluid to the pump or second conduit.

In some cases, a controller can be coupled to the optical sensor and arranged to receive a signal from the optical sensor. The controller can be configured to determine whether liquid is present or not in a conduit associated with the optical sensor based on the signal from the optical sensor. For example, the controller can be configured to prohibit at least some beverage machine functions (such as prohibiting activation of the pump) when the optical sensor detects absence of liquid at the second conduit. In some embodiments, the beverage machine can include a dispensing station, and the first and second conduits can be configured to supply liquid from the liquid supply tank to the dispensing station, e.g., to form and dispense a beverage.

In some embodiments, a beverage machine includes a liquid supply tank configured to hold a liquid for forming a beverage, a heater configured to heat the liquid from the liquid supply tank, and a conduit fluidly coupled between the liquid supply tank and the heater. The conduit can be configured such that, for at least some fill levels of the liquid supply tank, prior to initiation of a beverage cycle, a liquid level in the conduit corresponds to a liquid level in the liquid supply tank. An optical sensor can be configured to detect presence and absence of liquid at a level in the conduit located at a vertical height that is between a bottom of the liquid supply tank and a maximum fill level of the liquid supply tank. In some cases, the optical sensor can be configured to detect liquid that is not moving in the conduit and/or to detect liquid that is moving in the conduit.

In some cases, the conduit is configured to deliver liquid from the liquid supply tank to the heater, and the optical sensor is coupled to the conduit to detect liquid in the conduit. In some embodiments, a liquid supply line can be configured to deliver liquid from the liquid supply tank to the heater, and the conduit can be fluidly coupled to the liquid supply line and be separate and distinct from the liquid supply line. A dispensing station can receive liquid from the conduit and/or other supply line to form and dispense a beverage.

A controller can be coupled to the optical sensor and arranged to receive a signal from the optical sensor, e.g., the controller can be configured to prohibit at least some beverage machine functions (such as pump operation) when the optical sensor detects absence of liquid at the level in the conduit. The optical sensor can be upstream and/or downstream of the pump. In some cases, a second sensor such as a conductive probe sensor can be upstream of the pump to detect presence and absence of liquid in the conduit.

These and other aspects of the disclosure will be apparent from the following description and claims. It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

In the drawings, each identical or nearly identical component that is illustrated in various figures may be represented by a like numeral. For purposes of clarity, not every component may be labeled in every drawing. In the drawings.

DETAILED DESCRIPTION

It should be understood that aspects of the disclosure are described herein with reference to certain illustrative embodiments and the figures. The illustrative embodiments described herein are not necessarily intended to show all aspects of the disclosure, but rather are used to describe a few illustrative embodiments. Thus, aspects of the disclosure are not intended to be construed narrowly in view of the illustrative embodiments. In addition, aspects of the disclosure may be used alone or in any suitable combination with other aspects of the disclosure.

Generally speaking, a beverage machine may be used to form any suitable beverage, such as tea, coffee, other infusion-type beverages, beverages formed from a liquid or powdered concentrate, soups, juices or other beverages made from dried materials, carbonated or uncarbonated beverages. The beverage machine can form such beverages using a base liquid, such as water, stored in a liquid supply tank. A beverage machine can be capable of forming a variety of beverages, each requiring a different amount of the base liquid. Thus, it may be desirable for a beverage machine to include features that allow the beverage machine to detect one or more physical characteristics of the liquid, e.g., detect a liquid level in the liquid supply tank, detect that liquid is available for use and/or is being provided to the machine components, detect a temperature of the liquid, etc. As discussed in more detail below, in some embodiments a beverage machine can include a sensor to detect disconnection of a liquid supply tank and/or a liquid fill level in the liquid supply tank being above or below a threshold level, e.g., too low for beverage formation. In some embodiments, a single sensor can detect two different potential error states (e.g., disconnection and/or low liquid level) and assist in appropriate control of the beverage machine.

Figure 1:
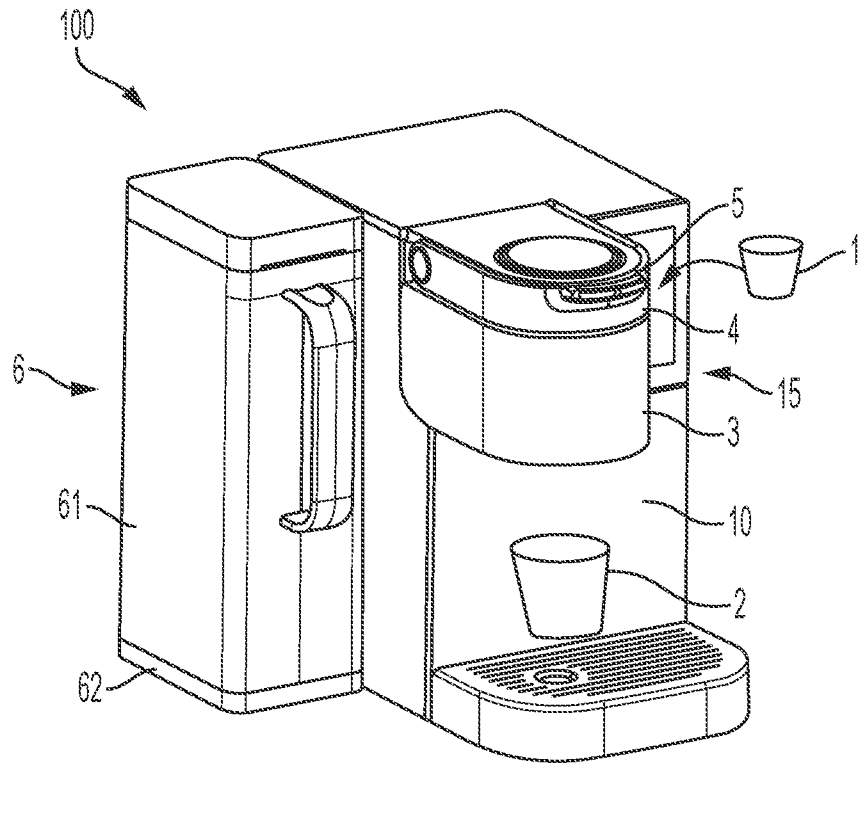
FIG. 1 is a perspective view of a beverage machine in an illustrative embodiment.

FIG. 1 shows a perspective view of a beverage machine 100 that incorporates features of this disclosure. In this illustrative embodiment, the machine 100 is arranged to form coffee or tea beverages. As is known in the art, a beverage cartridge 1 may be provided to the system 100 and used to form a beverage that is deposited into a user's cup or other suitable container 2. The cartridge 1 may be manually or automatically placed in a brew chamber of a beverage dispensing station 15 that in some embodiments includes a cartridge holder 3 and cover 4 of the beverage machine 100. For example, the holder 3 may be or include a circular, cup-shaped or otherwise suitably shaped opening in which the cartridge 1 may be placed. With a cartridge 1 placed in the cartridge holder 3, a handle 5 may be moved by hand (e.g., downwardly) so as to move the cover 4 to a closed position (as shown in FIG. 1). In the closed position, the cover 4 at least partially covers the cartridge 1, which is at least partially enclosed in a space in which the cartridge is used to make a beverage. For example, with the cartridge 1 held by the cartridge holder 3 in the closed position, water or other liquid may be provided to the cartridge 1 (e.g., by injecting the liquid into the cartridge interior) to form a beverage that exits the cartridge 1 and is provided to a cup 2 or other container. Of course, aspects of the disclosure may be employed with any suitably arranged system 100, including drip-type coffee brewers, carbonated beverage machines, and other systems that deliver water or other liquid to form a beverage. Thus, a cartridge 1 need not necessarily be used, but instead the beverage dispensing station 15 can accept loose coffee grounds or other beverage material to make a beverage. Also, the dispensing station 15 need not necessarily include a cartridge holder 3 and a cover 4. For example, dispensing station 15 can include a filter basket that is accessible to provide beverage material (such as loose coffee grounds), and the filter basket itself may be movable, e.g., by sliding engagement with the beverage machine housing 10, and a cover 4 may be fixed in place. In other embodiments, the dispensing station 15 need not be user accessible, but instead beverage material may be automatically provided to, and removed from, the dispensing station 15. Moreover, the system 100 need not have a brew chamber, but instead other types of dispensing stations, e.g., that dispense hot and/or cold water (whether still or carbonated) at an outlet such as a dispensing nozzle without mixing with any beverage ingredient. Accordingly, a wide variety of different types and configurations for a dispensing station may be employed with aspects of this disclosure.

In some embodiments, the beverage machine 100 uses liquid, such as water, that is provided by a liquid supply 6 to form a beverage. In some embodiments, the liquid supply 6 can include a tank 61 arranged to hold water or other liquid. The tank 61 may have a disconnected state and a connected state. In some embodiments, the tank 61 can be removably supported on a base 62, which fluidly couples to a port on a bottom of the tank 61 to receive and deliver liquid to other components of the machine 100, such as the dispensing station 15. A removable tank 61 can be convenient for a user because the user can remove the tank 61 from the base 62, e.g., by grasping a handle on the tank 61, for filling and then replace the tank 61 on the base 62. This is just one example, however, and a machine 100 can receive and/or store liquid in other ways. For example, the machine 100 can have a connection to a mains water supply (e.g., so-called "city water" or a line that delivers water under pressure to the machine 100), can have an internal or non-removable liquid supply tank or reservoir, or other.

In some embodiments, the machine 100 has one or more sensor components, and some of those components may detect conditions of the liquid supply tank 61, such as disconnection of the liquid supply tank from the beverage machine, and whether a fill level in the liquid supply tank 61 is above or below a threshold, e.g., too low for beverage formation. Such sensor components can be part of a sensor circuit that is used by a machine controller to detect the condition of the liquid supply tank 61 and control the machine 100 accordingly. As an example, a controller can use an absence of liquid signal from a sensor circuit to provide an indication to a user that water needs to be added to the tank 61 and/or the tank 61 needs to be connected to the beverage machine.

In some embodiments, for example, the beverage machine 100 can have a sensor component arranged to detect the presence or absence of liquid in a conduit that is in fluid communication with the liquid supply tank. In some embodiments, the conduit is a supply line that supplies liquid from the liquid supply tank toward a dispensing station of the beverage machine. In some embodiments, the conduit with which the sensor component is associated can be separate and distinct from a supply line.

Figure 2:
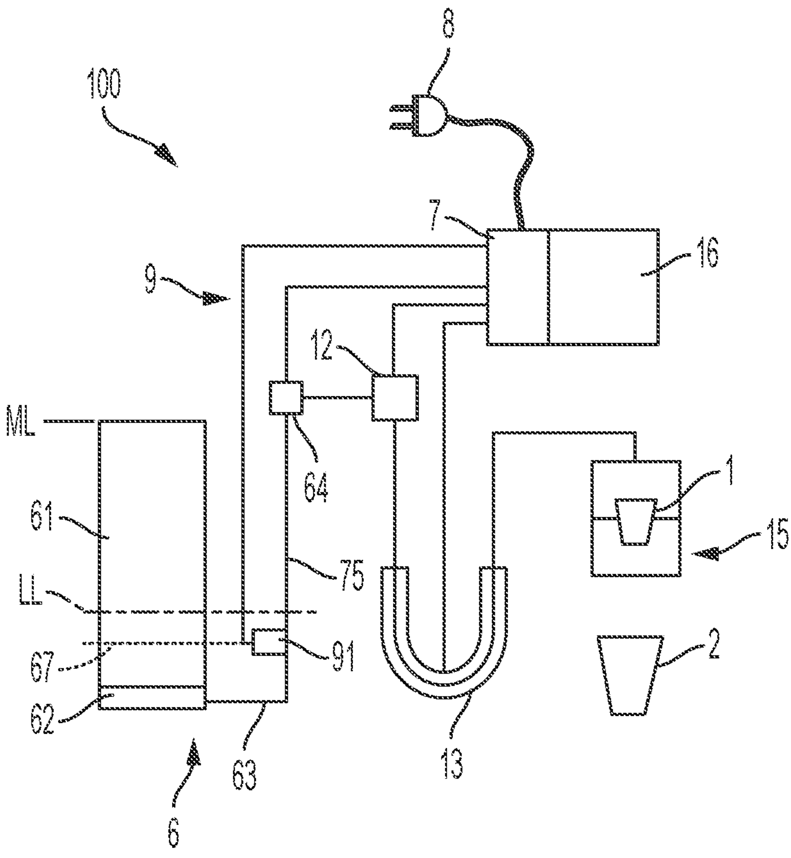
FIG. 2 is schematic diagram of selected components of the beverage machine in an illustrative embodiment.

FIG. 2 shows a schematic diagram of selected beverage machine 100 components in one embodiment that employs a sensor circuit 9 that has a sensor component 91 arranged to detect liquid in a supply line 63, e.g., at a level 67 that is between a bottom of the tank 61 and a maximum fill level ML of the tank 61. In some examples, the sensor 91 includes at least one conductive probe arranged to contact liquid in a conduit 75 that is part of the supply line 63, and/or at least one optical sensor configured to detect the presence and/or absence of liquid in the conduit 75. In some cases, an optical sensor 91 can be configured to detect the presence or absence of liquid that is not moving or is static in the conduit 75. In some embodiments, the optical sensor may be positioned external to the conduit 75 such that the optical sensor does not contact liquid in the conduit. The supply line 63 may be fluidly coupled to the tank 61 (e.g., via a port at a bottom of the tank 61) and may be arranged to supply liquid from the tank 61 toward a dispensing station 15. In some embodiments, the supply line 63 may be arranged to deliver liquid to a pump 12. The pump 12 can have an inlet fluidly coupled to the supply line 63 to receive liquid from the tank 61, and can deliver the liquid via an outlet to a heater 13 (or other liquid conditioner such as a chiller, carbonator, etc. that is fluidly coupled to the pump outlet), which heats (cools, carbonates, etc.) the liquid that is subsequently delivered to the dispensing station 15. In some embodiments, the heater 13 is an in-line heater.

In FIG. 2, the sensor component 91 is shown fluidly coupled between the tank 61 and the pump 12 (i.e., downstream of the tank 61 and upstream of the pump 12), but the sensor 91 (or other additional sensors) can be located in other places, such as between the pump 12 and heater 13 (i.e., downstream of the pump 12 and upstream of the heater 13), downstream of the heater 13, etc. Also, the pump 12 is shown in a position above the maximum fill level ML of the tank 61, but the pump 12 can be located elsewhere, such as below the maximum fill level ML, at or below the bottom of the tank 61, etc. Similar is true for the heater 13.

In some embodiments, the sensor component 91 can detect the presence or absence of liquid in the supply line 63. The sensor component 91 detecting an absence of liquid may indicate that the tank 61 is disconnected from the machine 100, has an exhausted liquid supply and/or that a liquid level in the tank 61 is below a threshold level. In the arrangement of FIG. 2, the supply line 63 is fluidly coupled to the bottom of the tank 61 and extends upwardly, e.g., above a maximum fill level ML of the tank 61. Since the sensor component 91 is arranged in the supply line 63, this can allow the sensor component 91 to detect whether liquid is present at least at one location or level 67 in the line 63, e.g., whether liquid is present in the line 63 above or below the sensor component 91 location. In some cases, the sensor component 91 can detect whether a liquid level LL of liquid in the supply line 63 is above or below a location 67 of the sensor component 91 along the supply line 63. This can allow a determination of whether a liquid level LL in the tank 61 is below a threshold level, such as a minimum level required to dispense a beverage. In some embodiments, the supply line 63 can include a vent 64 arranged to vent the supply line 63 to atmospheric or other ambient pressure. The vent may, in some embodiments, have an opened configuration and a closed configuration. For example, the vent 64 can include an electrically-operated valve that a controller 16 can open to expose the supply line 63 to ambient pressure. In some embodiments, the vent 64 can include a permanently open orifice or other opening, and/or the vent 64 can be positioned upstream of the pump 12. The vent 64 opening size can be arranged relative to the pump capacity such that the pump can deliver liquid for beverage formation even though air may be drawn into the vent 64 during pump operation. In some cases, the vent 64 can be positioned above the maximum fill level ML and/or above a position of the sensor component 91. Venting of the supply line 63 can allow the liquid level in the supply line 63 to correspond to (e.g., is the same as) the liquid level LL in the tank 61 for at least some conditions, such as when the pump 12 is not operating.

In some embodiments, the tank 61 may have a low-level threshold, e.g., at a position or height 67 at which the sensor 91 detects the presence/absence of liquid, corresponding to a minimum amount of liquid volume in the tank 61 required to form a beverage or otherwise run a beverage cycle. When the liquid level LL in the tank 61 falls below the low-level threshold 67, the volume of liquid in the tank 61 may be too low to form a beverage or otherwise run a beverage cycle. The sensor component 91 may be located at or otherwise detect presence/absence of liquid at a height in the supply line 63 that is the same height as the low-level threshold 67 in the tank 61, or that is above or below the low level threshold 67.

In the FIG. 2 embodiment, if the supply line 63 is vented and the sensor component 91 detects the presence of liquid, the controller 16 can determine that the liquid level LL in the tank 61 is above the position or height of the sensor component 91 (e.g., above a low-level threshold 67), and if the sensor component 91 does not detect the presence of liquid (i.e., detects the absence of liquid), the controller 16 can determine that the liquid level LL in the tank 61 is below the position or height of the sensor component 91 or that the tank 61 is disconnected from the supply line 63. The sensor component 91 can be configured to detect the presence and/or absence of liquid when the fluid (air or liquid) in the conduit is stationary or not moving in the conduit and/or when the fluid is moving in the conduit. Thus, the sensor component 91 can detect the presence/absence of fluid when the pump 12 is running or not.

In some embodiments, the pump 12 is located at or above the maximum fill level ML of the tank 61 or at least downstream of the location of the sensor component 91 along the supply line 63. This arrangement can allow a determination of whether liquid is being supplied to the pump 12 or not and can be useful to determine whether the tank 61 is disconnected from the machine 100 and/or a liquid supply in the tank 61 has been exhausted. For example, if the tank 61 is removed from the base 62 or runs out of liquid during operation of the pump 12 in drawing liquid from the tank 61, air will be drawn into the supply line 63 rather than liquid. When air reaches the sensor component 91, the sensor component 91 can detect the absence of liquid and thus that the tank 61 has been removed or the liquid supply exhausted. With the sensor component 91 upstream of the pump 12 and/or upstream of the heater 13, the sensor component 91 may be able to detect absence of liquid prior to air reaching the pump and/or the heater. This may help to avoid overheating of the heater and/or enable early deactivation of the heater, pump and/or other beverage machine components.

Figure 3:
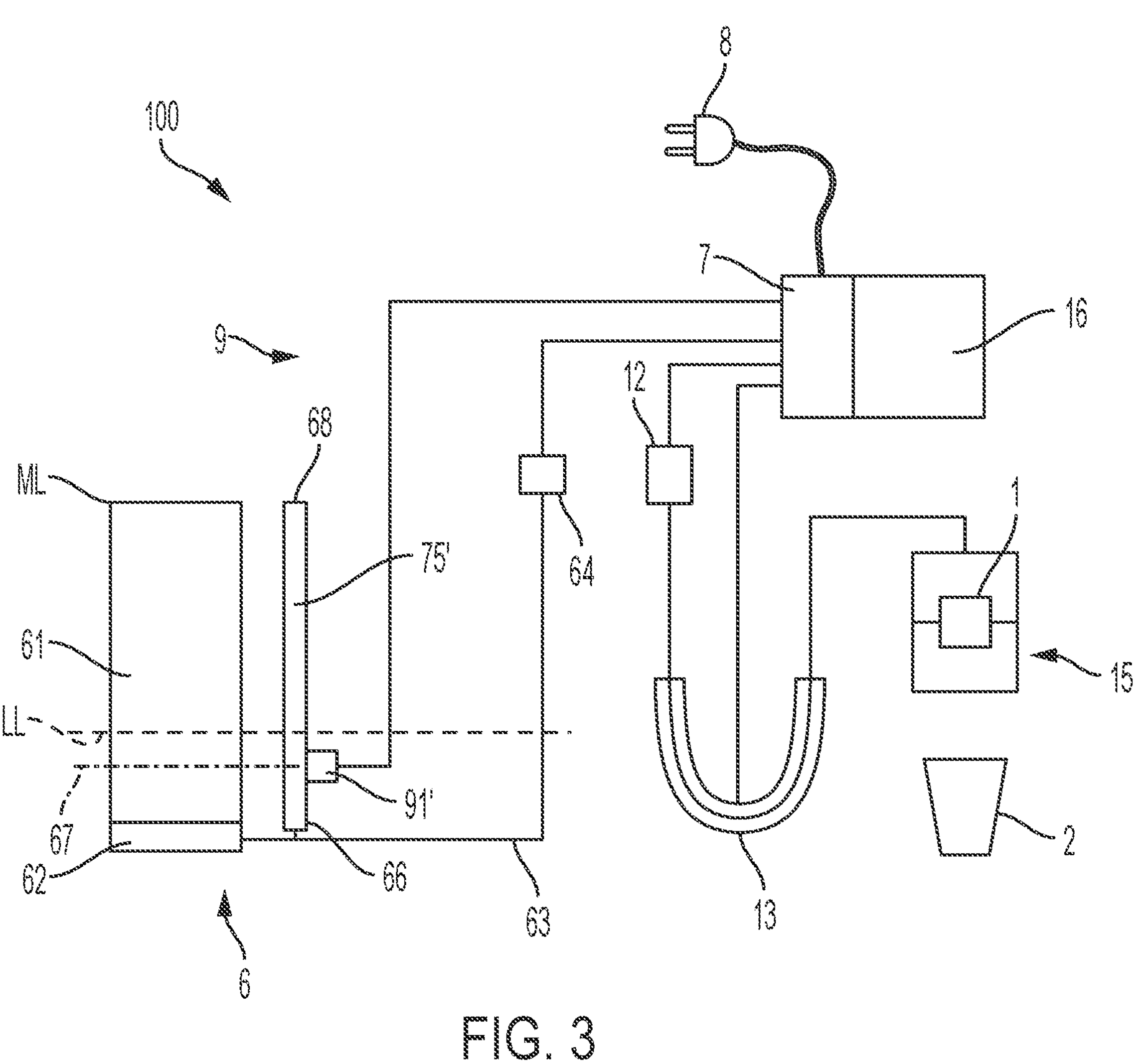
FIG. 3 is schematic diagram of selected components of the beverage machine in an illustrative embodiment in which a sensor is configured to detect liquid in a conduit fluidly coupled to a supply line.

It should be appreciated that the sensor component 91 may be located in other places besides the liquid supply line 63. FIG. 3 depicts an alternative illustrative embodiment in which a sensor component 91' is arranged to detect the presence or absence of liquid in a conduit 75' that is fluidly coupled to, but separate and distinct from, the liquid supply line 63 that supplies liquid from the tank 61 toward the dispensing station 15. The conduit 75' may serve as a reference vessel that is fluidly connected to the liquid supply tank 61 such that a liquid level in the conduit 75' corresponds to (e.g., is the same as) a liquid level LL in the tank 61. The conduit 75' may have a first end 66 that receives liquid from the tank 61 into the conduit 75', and a second, opposite end 68. In some embodiments, the second end 68 may be free from being fluidly connected to the supply line 63. The first end 66 may be at a bottom of the conduit 75' and the second end 68 may be at a top of the conduit. In some embodiments, liquid from the tank 61 may enter the conduit 75' through the first end 66, exit the conduit 75' back through the first end 66, and move into the liquid supply line 63. In some embodiments, the conduit 75' may be vented to ambient pressure, e.g., in the form of a permanently open orifice, or a controllable vent that can be opened or closed. In some embodiments, the second end 68 of the conduit 75' may connect back to the tank 61, e.g. forming a loop.

As with the FIG. 2 embodiment, the tank 61 in the FIG. 3 embodiment may have a low-level threshold 67 corresponding to a minimum amount of liquid volume required to form a beverage or otherwise run a beverage cycle. The sensor component 91' may be located at or otherwise detect presence/absence of liquid at a height in the supply line 63 that is the same height as a low-level threshold 67 in the tank 61. If the sensor component 91' detects the presence of liquid, the controller 16 can determine that the liquid level LL in the tank 61 is above the position or height of the sensor component 91 (e.g., above a low-level threshold 67). If the sensor component does not detect the presence of liquid (i.e., detects the absence of liquid), the controller 16 can determine that the liquid level LL in the tank 61 is below the position or height of the sensor component 91 or that the tank 61 is disconnected from the supply line 63. As in the FIG. 2 embodiment, the sensor component 91' can include at least one conductive probe arranged to contact liquid in the conduit 75' and/or an optical sensor, e.g., positioned external to the conduit 75' and configured to pass light through the conduit 75' to detect the presence/absence of liquid.

In the above embodiments, the controller 16 can control various components of the beverage machine 100 in different ways based on signals from the sensor. In some embodiments, the controller 16 can provide an indication to the user to add liquid to the tank 61 and/or shut down or reduce a heating rate of the heater 13 if the sensor component 91, 91' detects the absence of liquid. The sensor component 91, 91' can provide an indication that the tank 61 is removed from the machine 100 if the sensor component 91, 91' detects the absence of liquid while the pump 12 is drawing water from the tank 61. That is, if the tank 61 is removed as the pump 12 is pulling liquid from the supply line 63, liquid will no longer be provided to the inlet side of the supply line 63 and the pump 12 will empty the supply line 63. Once liquid is drawn past the sensor component 91, 91', the sensor component 91, 91' will no longer detect liquid, indicating that the tank 61 has been removed. In this case, the controller 16 can provide an indication to the user to replace the tank 61, stop pump and heater operation, etc.

As discussed above, in some embodiments, the sensor component of the beverage machine may comprise one or more conductive probes arranged to contact liquid in a conduit. In some embodiments, the sensor component comprises a plurality of conductive probes. For example, the sensor component may comprise 2, 3, 4, 5, or any other suitable number of conductive probes. Having a plurality of conductive probes may provide a back-up or redundancy in the event that a conductive probe should fail or otherwise function improperly, and/or may permit the use of different sensing techniques. In addition, or alternately, multiple conductive probes positioned along a length of the conduit 75 can allow the controller 16 to detect the presence or absence of liquid at multiple locations along the length of the conduit 75. This can allow the controller 16 to detect multiple liquid levels for the tank 61, e.g., such that the controller 16 can determine a volume of liquid in the tank 61. As an example, each detected liquid level can correspond to a particular volume of liquid in the tank 61, and thus detection of a particular liquid level can indicate the volume of liquid in the tank 61.

For example, one of the conductive probes may use a baseline probe circuit characteristic to determine when the probe is out of contact with liquid, as discussed in U.S. Pat. No. 7,360,418, incorporated by reference herein. In such an arrangement, a baseline probe circuit characteristic, e.g., a circuit resistance or voltage, is measured when the probe is out of contact with liquid. In one embodiment, the baseline characteristic may be compared to a circuit characteristic that is measured as liquid comes into contact with the probe. A difference between the baseline characteristic and the circuit characteristic may be used to determine whether or not the probe is in contact with the liquid.

Other known sensing techniques may be used by one or more of the conductive probes. For example, two conductive probes may be electrically insulated from each other except for a path through liquid present between the conductive probes. Thus, if water or other liquid is present between the conductive probes, a conductive path is established between the conductive probes, but no conductive path is present if liquid is not present between the conductive probes. This allows the sensor component to detect the presence or absence of liquid.

Figure 4:
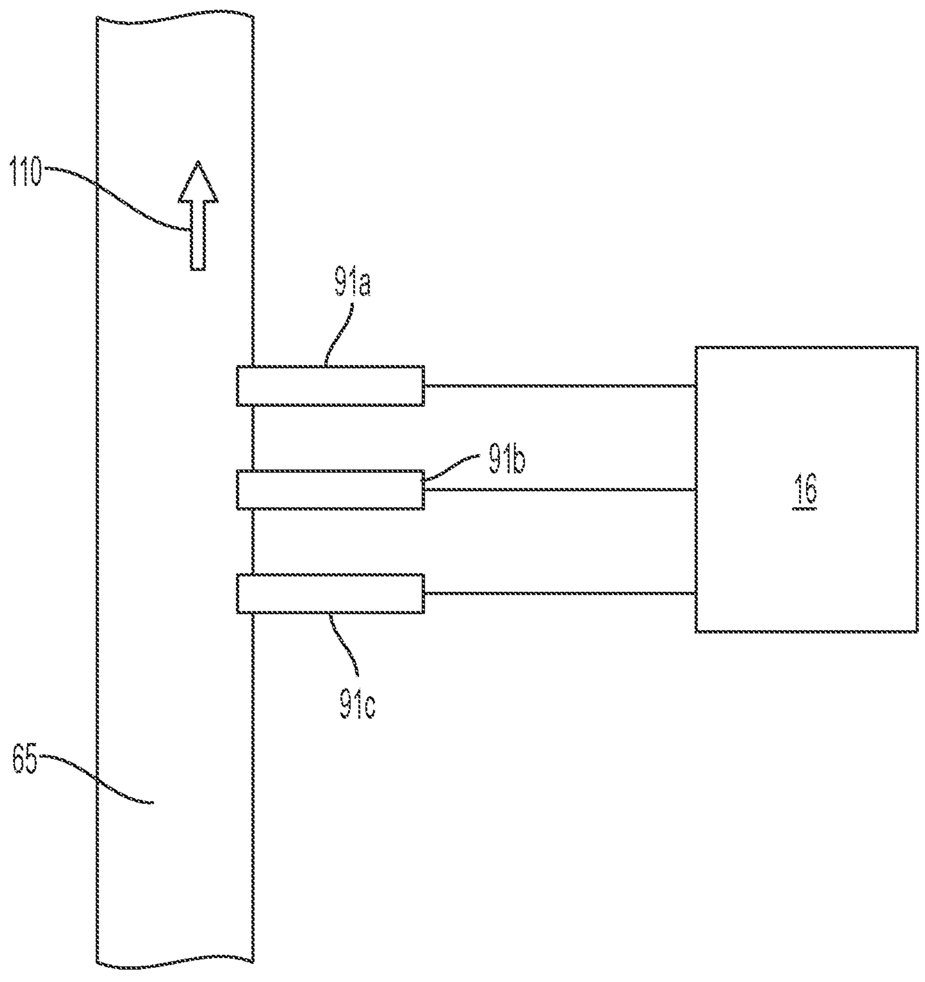
FIG. 4 is a diagram of a sensor having a plurality of conductive probes extending into a conduit.

FIG. 4 shows an illustrative embodiment of a sensor component comprising a first conductive probe 91*a*, a second conductive probe 91*b*, and a third conductive probe 91*c*, each operatively coupled to a controller 16. A portion of the conductive probes 91*a*, 91*b*, 91*c* extend into a conduit 65. The conduit 65 shown in FIG. 4 could be the conduit 75 of the FIG. 2 embodiment, or the conduit 75' of the FIG. 3 embodiment, or a conduit of another arrangement. In some embodiments, the conductive probes extend into the conduit 65 in a direction perpendicular to a flow direction 110 through the conduit. The conduit 65 may be made of any suitable material such as silicone, elastomer, rubber, plastic, an insulative material, or a conductive material such as metal. In some embodiments, the conductive probes 91*a*, 91*b*, 91*c* are molded into the conduit 65 or otherwise coupled to the conduit via any suitable arrangement.

While the sensor component 91 in the FIG. 4 embodiment includes at least one conductive element that contacts the liquid to detect the presence or absence of liquid, the sensor component 91 can be arranged in different ways and/or to detect other physical characteristics of the liquid. For example, the sensor component 91 can include a thermistor or other sensor arranged to contact liquid to detect a temperature of the liquid, a sensor arrangement to detect conductivity, salinity or other characteristic of the liquid, etc. In some embodiments, the sensor component 91 may detect two or more characteristics of the liquid, such as temperature and presence/absence. As an example, one of the first, second or third conductive probes 91*a*, 91*b*, 91*c* of the sensor component in FIG. 4 could be replaced with a thermistor sensor that includes a conductive element arranged to contact liquid in the supply line 63 and the sensor component could function as a conductive probe as well as temperature sensing. Thus, the sensor component 91 can operate as both a temperature sensor and a liquid presence/absence detector. (Additional sensor circuit 9 components would likely be required to allow for sensing temperature in addition to liquid presence/absence, e.g., a power supply line and signal line for the thermistor portion.) In some embodiments, the sensor component can include an optical sensor in addition to, or instead of, one or more conductive probes. The optical sensor can include one or more emitter/detector pairs to detect liquid presence/absence at multiple locations or height along a conduit.

Figure 5A:
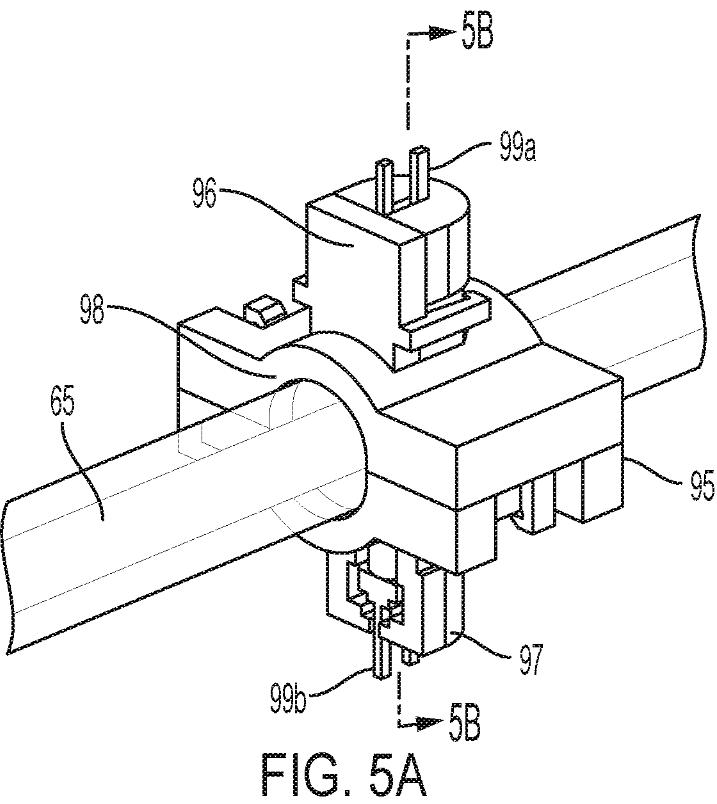
FIG. 5A is a perspective view of an optical sensor engaged with a conduit.
Figure 5B:
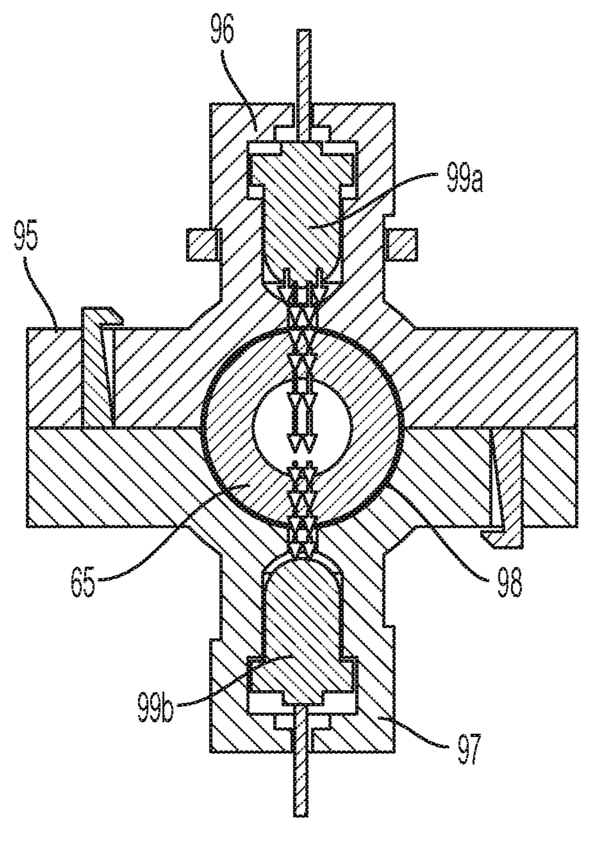
FIG. 5B shows a cross sectional view of the optical sensor of FIG. 5A along the line 5B-5B.

FIGS. 5A and 5B show an illustrative arrangement for an optical sensor to detect the presence and/or absence of liquid in a conduit. In this embodiment, the sensor 91 includes a body 95 that is made of a resilient material, such as silicone rubber. The body 95 has first and second portions 96, 97 that are each configured to engage with a respective light emitter and light detector 99*a*, 99*b*. For example, the first and second portions 96, 97 can be arranged at opposed ends of the body 95 and each have a hole or other recess in which to receive a respective light emitter or detector, such as an LED emitter and detector element 99*a*, 99*b*. Although FIGS. 5A and 5B show the body 95 having a cross or "X" shape, the body can be configured as an elongated rod (e.g., having a round, square or rectangular cross sectional shape) that includes the first and second portions 96, 97 at opposite ends of the rod. The hole or recess at the first and second portions 96, 97 can extend into the body 95 (e.g., toward the opening 98) and be configured to frictionally engage with the light emitter/detector so that respective optical axes for light emission and detection are suitably aligned with respect to the body 95. The body 95 can have an opening 98 between the first and second portions 96, 97 configured to receive and frictionally engage with a conduit 65. For example, the opening 98 can have a size that is smaller than an outer diameter of the conduit 65 so that the opening 98 is enlarged to receive the conduit 65. The resilient nature of the body 95 can cause the inner surface of the opening 98 to frictionally engage with the outer surface of the conduit 65, e.g., so the body 95 is self-supporting and remains in place on the conduit 65. The holes at the first and second portions 96, 97 can be configured to engage with the emitter and detector elements 99*a*, 99*b* so that their respective optical axes are oriented toward a lumen of the conduit 65 and directed toward each other, e.g., so light emitted by the emitter element 99*a* can be received by the detector element 99*b*. In some cases, the emitter and detector elements 99*a*, 99*b* can be molded with the body 95. The resilient nature of the body 95 can aid in alignment of the emitter and detector elements 99*a*, 99*b*, e.g., because the body 95 will urge the emitter and detector elements 99*a*, 99*b* toward a suitable alignment with respect to the opening 98 and the conduit 65. For example, the body 95 can urge the emitter and detector elements 99*a*, 99*b* so that their respective optical axes are oriented to be perpendicular to the conduit 65 and directed toward the center of the opening 98. In some embodiments, portions of the body 95 can filter or otherwise operate on light emitted by the emitter element 99*a*. For example, a part of the first and/or second portion 96, 97 can filter, focus, reflect, refract or otherwise operate on light directed toward and/or received from the opening 98. This can help ensure that the sensor can detect the presence and/or absence of liquid properly. The optical sensor can operate in any suitable way to detect liquid presence/absence, e.g., by having light emitted by the emitter element 99*a* be attenuated, reflected, refracted, etc. by liquid in the conduit 65 which can be detected by the detector element 99*b*. As an example, if liquid is present in the conduit 65, light emitted by the emitter element 99*a* can be absorbed or otherwise operated on by the liquid so that an amount of light received at the detector element 99*b* is attenuated in comparison to when no liquid is present in the conduit 65. This is just one example of how the optical sensor can operate to detect the presence and/or absence of liquid, as will be understood by those of skill in the art.

Figure 6:
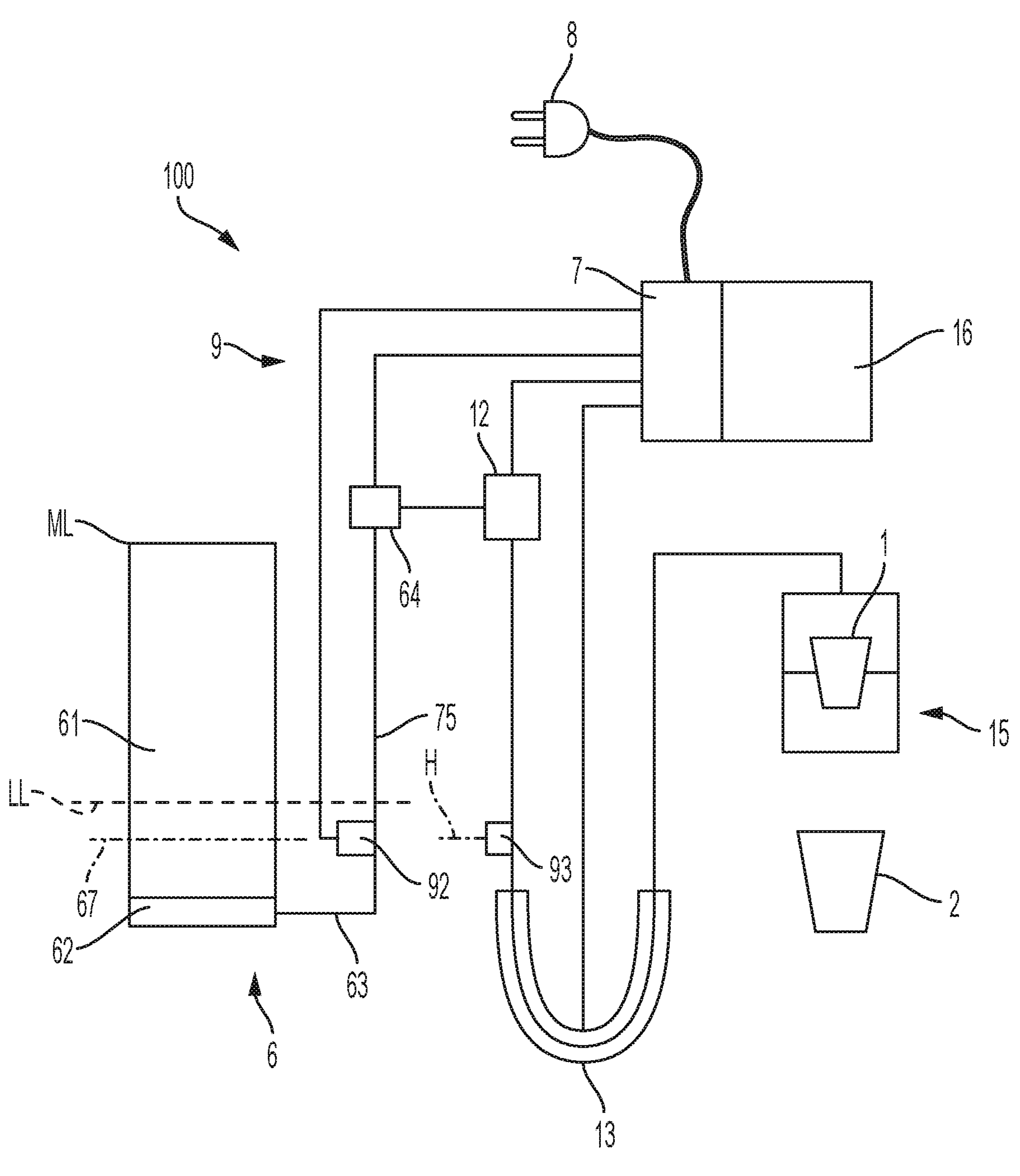
FIG. 6 shows a schematic diagram of components of a beverage machine including two sensors configured to detect liquid in a liquid supply line.

As noted above, in some embodiments a beverage machine can include two or more sensors to detect the presence and/or absence of liquid. Such sensors can perform various functions such as detecting whether a liquid level in a tank 61 is below a low-level threshold, detecting an actual liquid level in the tank 61, detecting whether liquid is present at the inlet to a heater, detecting whether liquid is present at a pump, etc. For example, FIG. 6 shows an embodiment in which a first sensor 92 is associated with a conduit 75 that is part of the liquid supply line 63 and is coupled between the tank 61 and a pump 12. The sensor 92 can be a conductive probe sensor, optical sensor, or other sensor configured to detect the presence and/or absence of liquid in the conduit 75 as discussed above. In some cases, the sensor 92 can be arranged between the bottom of the tank 61 and a maximum fill level ML of the tank, and a liquid level in the conduit 75 can at least in some cases correspond to a liquid level in the tank 61 (such as when the pump 12 is not running and the vent 64 is open). The sensor 92 can thus be employed to determine whether the tank 61 has sufficient liquid for a beverage cycle or not, and/or whether the tank 61 is connected to the supply line 63 or not.

A second sensor 93 can be positioned downstream of the first sensor 92 and be associated with the supply line 63 to detect the presence and/or absence of liquid in a location. The second sensor 93 can be a conductive probe sensor, optical sensor or other suitable sensing arrangement, and can be arranged between the bottom of the tank 61 and a maximum fill level ML of the tank. In some cases, a liquid level in the conduit where the second sensor 93 is located can correspond to a liquid level in the tank 61 (such as when the pump 12 is not running and the vent 64 is open). For example, the vent 64 could be positioned downstream of the second sensor 93 and the pump 12 and supply line 63 arranged so that the liquid level in the supply line portion 63 where the second sensor 93 is located corresponds to the liquid level LL in the tank 61. This can allow the second sensor 92 to detect whether a liquid level in the tank 61 is suitable to perform one or more beverage cycles.

In some embodiments, the second sensor 93 can operate to detect whether liquid is being moved by the pump 12 (as opposed to air) and/or whether liquid is being delivered to the heater 13. This can allow the second sensor 93 to provide information to the controller 16 to determine an actual volume of liquid in the tank 61 and/or to allow the controller 16 to continue operation of the pump 12, heater 13 and/or other components even when the first sensor 92 detects an absence of liquid at the first sensor 92. For example, as discussed more below, the beverage machine can be arranged so that the pump 12 initially pumps air at the beginning of every beverage cycle (e.g., where the supply line 63 is vented to atmosphere upstream of the pump 12) and the controller 16 can determine a liquid level and thus volume of liquid in the tank 61 by determining how much air must be pumped from the supply line 63 before liquid arrives at the pump 12. The second sensor 93 can be employed to determine whether air or liquid is being moved by the pump 12, and thus provide information to the controller 16 that can be used to determine the liquid level in the tank 61. In some embodiments, the controller 16 can continue operation of the pump 12, heater 13 and/or other components even if the first sensor 92 detects an absence of liquid. That is, if the second sensor 93 detects the presence of liquid, the controller 16 continue operation of the pump 12 and heater 13 so long as the second sensor 93 detects the presence of liquid. This can allow the controller 16 to complete or at least more fully complete a beverage cycle even if a tank 61 runs out of liquid or is removed from the machine during a beverage operation. That is, even if the tank 61 is removed during a beverage operation, and the first sensor 92 detects an absence of liquid, there may still be liquid remaining in the supply line 63 to continue delivery of liquid to the heater 13 and dispensing station 15. The controller 16 may continue operation of the pump 12 and/or heater 13 so long as the second sensor 93 detects the presence of liquid. Once the second sensor 93 detects the absence of liquid, the controller 16 may stop operation of the heater 13 and continue operation of the pump 12 so that all liquid in the line 63 is delivered to the dispensing station 15. This can help the machine complete a beverage cycle at least to the best of its ability given the liquid available. Alternately, if the first sensor 92 detects the absence of liquid due to sensor failure or other abnormality (such as an air bubble stuck at the sensor 92) rather than actual removal of the tank 61 or exhaustion of the liquid supply, the second sensor's 93 continued detection of liquid can allow the controller 16 to continue performance and completion of a beverage cycle despite the first sensor 92 indicating no liquid is present. This can provide failure tolerance for the beverage machine.

Figure 7:
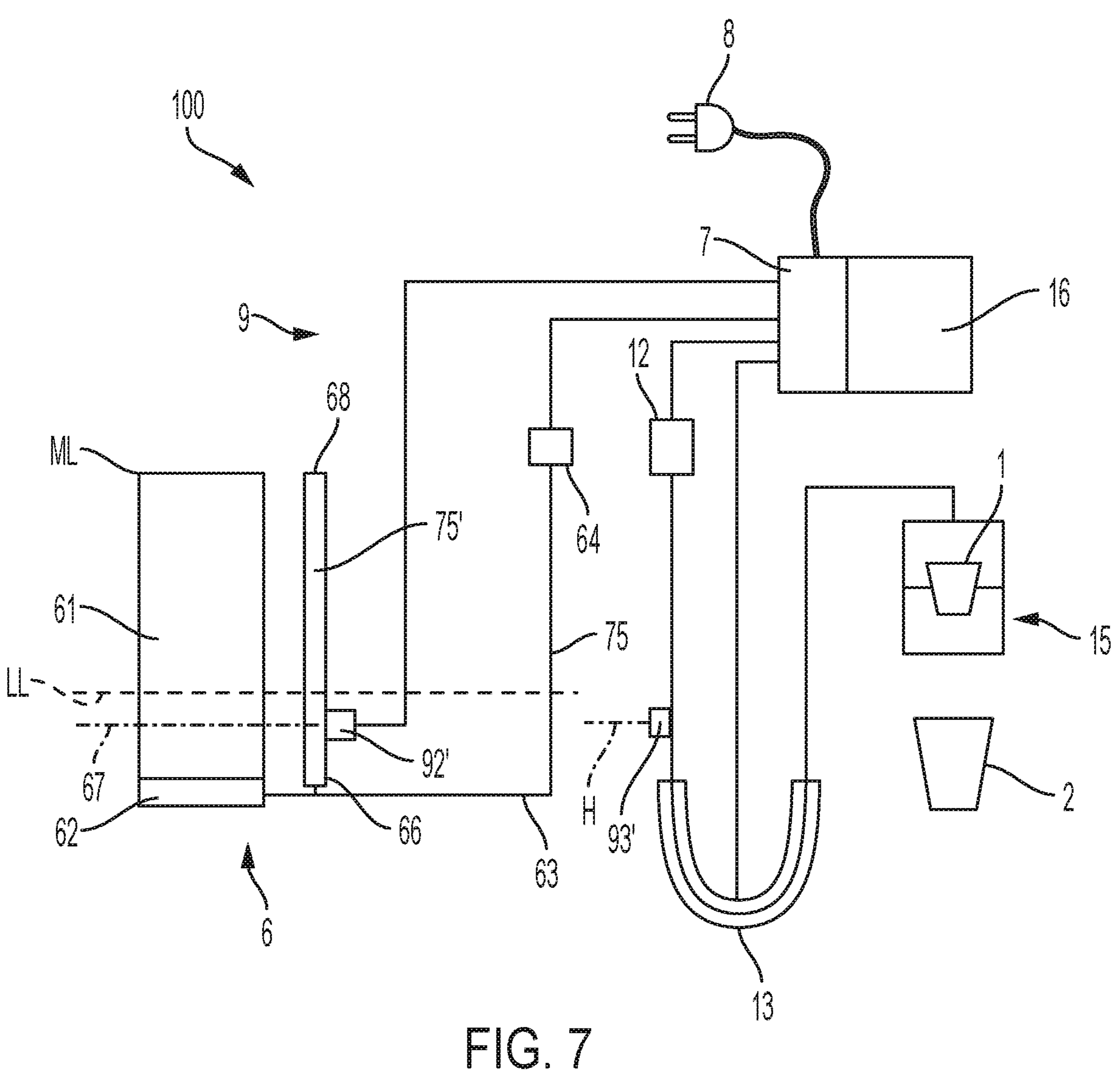
FIG. 7 shows a schematic diagram of components of a beverage machine including a first sensor configured to detect liquid in a conduit fluidly coupled to a supply line and a second sensor configured to detect liquid in the supply line.

First and second sensors for detecting the presence and/or absence of liquid can be configured in other ways than those discussed with respect to the FIG. 6 embodiment. For example, FIG. 7 shows an embodiment similar to that of FIG. 3 in which a first sensor 92' is associated with a conduit 75' that is fluidly coupled to the liquid supply line 63 but is not configured to deliver liquid to the pump 12, heater 13, etc., but rather is a separate and distinct conduit. The second sensor 93' can be configured as discussed above with respect to FIG. 6, e.g., associated with a portion of the supply line 63 downstream of the first sensor 92' and pump 12 and upstream of the heater 13. The first sensor 92' can be configured in any of the ways discussed above with respect to FIGS. 3 and 6, and the second sensor 93' can be configured in any of the ways discussed above with respect to FIG. 6. The first and second sensors 92' and 93' can, for example, be configured to include one or more conductive probes, an optical sensor or other component to detect the presence and/or absence of liquid.

In some embodiments, the beverage machine may include a sensor configured to determine whether the pump is pumping liquid or gas. Such a sensor may enable the beverage machine to determine a volume of liquid present in the liquid supply tank. The sensor may be at or near the pump, and in some embodiments, may be integrated with the pump. In some embodiments, the sensor can detect pump voltage and/or current, and based on the measured voltage and/or current, determine when liquid arrives at the pump. As an example, the current draw by the pump may change when liquid arrives at the pump, e.g., the current draw may increase when the pump transitions from pumping gas to pumping water. The controller can use this change in voltage and/or current to detect when liquid arrives at the pump, and thus when the gas volume has been removed from the liquid supply line. In some embodiments, the sensor can be a conductive, capacitive, optical or other sensor that detects when liquid arrives at the pump or at some other location in the conduit, e.g., upstream and/or downstream of the pump. The sensor may be used in different arrangements to determine a volume of liquid present in the liquid supply tank, as discussed herein.

For example, in some embodiments, the beverage machine may be configured to determine a volume of liquid in the liquid supply tank based on a gas volume in the liquid supply line at a start of a beverage cycle based on a number of pump cycles or pump operation time required to pump the gas volume out of the liquid supply line. The pump may be arranged to pump a particular volume of fluid (liquid or gas) for each pump operation cycle and/or for a particular operation time. As discussed above, a supply line 63 leading to a pump 12 may be vented so that a liquid level in the supply line 63 corresponds to the liquid level in the tank 61. Thus, a volume of air may be present in the supply line 63 between the liquid level in the tank 61 and the pump 12 so that the pump 12 initially pumps air until all of the air is evacuated and liquid arrives at the pump 12. By determining a number of pump cycles or operation time to pump gas from a conduit of a liquid supply line, the controller can determine a gas volume pumped from the supply line 62 and thus the liquid level in the tank 61. A sensor may be used to detect pump operation cycles, e.g., revolutions of a pump shaft, cycles of a piston or other pump component, etc. Note that a single sensor component may be configured to determine whether the pump is pumping liquid or gas and may also be used to detect pump operation cycles. For example, in some embodiments, a sensor component can detect two or more characteristics of the system, such as pump cycles and the presence of liquid at a point in the liquid supply line, and may use two or more distinct sensors to do so, e.g., an infrared sensor to detect pump shaft revolutions and a conductive probe or optical sensor to detect liquid. In other embodiments, however, these sensors may be separated into distinct sensor components.

Sensor component(s) may be in electronic communication with the controller which can use information (e.g., one or more signals) from the sensor component(s) to determine the volume of gas in a conduit of the liquid supply line, a volume of liquid, or other features of the system.

As another example, in some embodiments, the beverage machine may be configured to determine the volume of liquid in the liquid supply tank based on an operation time of the pump required to pump the gas volume from the liquid supply line. The controller may be configured to measure the operation time of the pump when the sensor determines that the pump is pumping gas and to stop measuring the operation time of the pump when the sensor determines that the pump is pumping liquid. The pump operation time can indicate the amount of gas pumped from the supply line and thus indicate the liquid level in the supply line and tank.

Other operation parameters besides pump cycles and operation time may be tracked to determine volume of liquid in the liquid supply tank, such as instantaneous flow rate of fluid through pump, average flow rate of fluid through pump, etc. With any of the aforementioned approaches to determining liquid level, the controller may use an algorithm to calculate volume of liquid in the liquid supply tank, and/or a lookup table to determine the corresponding volume of liquid.

To initiate a beverage cycle, a user may first insert a cartridge 1 into the dispensing station 15 and provide an indication (e.g., by pressing a button or other suitable step) to beverage machine 100 to prepare a beverage. At or before this time, the controller 16 can monitor the sensor circuit 9 to assess whether liquid is present at the sensor component 91 or not and/or a temperature at the sensor component 91. If the supply line 63 is provided with a controllable vent 64, the controller 16 can open the vent valve 64 to help ensure that the liquid level in the supply line 63 is equal to the liquid level in the tank 61. If no liquid is detected, the controller 16 can stop beverage formation and provide an indication to the user, e.g., via a user interface on the housing 10, that water or other liquid must be added and/or the tank 61 replaced. If liquid is detected, the controller 16 can proceed with beverage formation, e.g., including closing the vent 64, operating the pump 12 to deliver liquid to the heater 13, etc. During pump 12 operation, the controller 16 can monitor the sensor circuit 9 for the absence of liquid. If an absence of liquid is detected, the controller 16 can stop pump operation, heating and/or other functions, e.g., because the tank 61 may have been removed and/or a liquid supply in the tank 61 is exhausted. The controller 16 can provide an indication to a user via the user interface that the tank 61 should be replaced to begin or restart beverage dispensing.

In some embodiments, the sensor component 91 is arranged to determine tank 61 disconnection and/or exhausted liquid supply in the tank 61 without requiring pump operation. Prior to pump operation, the liquid level LL in the tank 61 may correspond with (e.g., be the same as) a liquid level in the conduit 75 in FIG. 2 (or 75' in FIG. 3). The sensor component 91 detecting absence of liquid may indicate that either the tank 61 is disconnected, or a liquid supply in the tank 61 is exhausted or otherwise below a low-level threshold 67. In some embodiments, when a user actuates a beverage cycle, the sensor component 91 may send a no-liquid detected signal to the controller 16, and the controller in turn may prohibit operation of the pump 12 and/or heater 13.

As noted above, operation of the pump 12, heater 13 and other components of the machine 100 may be controlled by the controller 16, which may include a programmed processor and/or other data processing device along with suitable software or other operating instructions, one or more memories (including non-transient storage media that may store software and/or other operating instructions), temperature and liquid level sensors, pressure sensors, input/output interfaces (such as a user interface on the housing 10), communication buses or other links, a display, switches, relays, triacs, or other components necessary to perform desired input/output or other functions. The controller 16 can include components to receive power from a mains supply, such as a plug or other connector 8 to receive mains power from a household outlet and a power supply 7 which can condition power received from the mains supply as necessary for various machine components. For example, the power supply 7 can include one or more transformers, power converters (e.g., including one or more rectifiers), batteries or other power storage, and so on to provide suitable AC and/or DC power to machine components. A user interface may be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on.

While aspects of the disclosure may be used with any suitable cartridge, or no cartridge at all, some cartridges may include features that enhance the operation of a beverage machine 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a cup 2. As will be understood by those of skill in the art, cartridges in the form of a pod having opposed layers of permeable filter paper encapsulating a beverage material may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage material, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 1 contains a beverage material that is configured for use with a machine that forms coffee and/or tea beverages, however, aspects of the disclosure are not limited in this respect.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

As used herein, "beverage" refers to a liquid substance intended for drinking that is formed when a liquid interacts with a beverage material, or a liquid that is dispensed without interacting with a beverage material. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

The invention claimed is:

1. A beverage machine comprising:

a liquid supply tank configured to hold a liquid for forming a beverage;

a heater configured to heat the liquid from the liquid supply tank;

a conduit fluidly coupled between the liquid supply tank and the heater, the conduit being configured such that, for at least some fill levels of the liquid supply tank, prior to initiation of a beverage cycle, a liquid level in the conduit corresponds to a liquid level in the liquid supply tank;

an optical sensor configured to detect presence and absence of liquid at a level in the conduit located at a vertical height that is between a bottom of the liquid supply tank and a maximum fill level of the liquid supply tank;

a controller coupled to the optical sensor and arranged to receive a signal from the optical sensor, wherein the controller is configured to prohibit at least some beverage machine functions when the optical sensor detects absence of liquid at the level in the conduit; and a pump fluidly coupled to the liquid supply tank and configured to move liquid from the liquid supply tank to the heater, wherein the controller is arranged to prohibit activation of the pump when the optical sensor detects absence of liquid at the level in the conduit.

2. The beverage machine of claim 1, wherein the optical sensor includes a body made of a resilient material and including first and second portions and an opening located between the first and second portions, the opening configured to receive and frictionally engage with the conduit, the first portion configured to support a light emitter to emit light toward the opening and through the conduit engaged at the opening, and the second portion configured to support a light detector to detect light transmitted by the light emitter toward the opening.

3. The beverage machine of claim 1, wherein the conduit is configured to deliver liquid from the liquid supply tank to the heater and the optical sensor is coupled to the conduit to detect liquid in the conduit.

4. The beverage machine of claim 1, further comprising a liquid supply line configured to deliver liquid from the liquid supply tank to the heater, wherein the conduit is fluidly coupled to the liquid supply line and is separate and distinct from the liquid supply line.

5. The beverage machine of claim 1, wherein the optical sensor is upstream of the pump.

6. The beverage machine of claim 1, wherein the optical sensor is downstream of the pump.

7. The beverage machine of claim 6, further comprising a second sensor upstream of the pump to detect presence and absence of liquid in the conduit.

8. The beverage machine of claim 7, wherein the second sensor is a conductive probe sensor.

9. The beverage machine of claim 1, wherein the optical sensor is configured to detect liquid that is not moving in the conduit.

10. The beverage machine of claim 1, wherein the optical sensor comprises:

a body made of a resilient material and including first and second portions and an opening located between the first and second portions, the opening configured to receive and frictionally engage with a conduit for carrying liquid, the first portion configured to support a light emitter to emit light toward the opening and through a conduit engaged at the opening, and the second portion configured to support a light detector to detect light transmitted by the light emitter toward the opening.

11. The beverage machine of claim 10, wherein the first and second portions are configured to frictionally engage with the light emitter and light detector, respectively, such that optical axes of the light emitter and light detector are aligned with each other.

12. The beverage machine of claim 10, wherein one of the first and second portions is configured to filter light emitted by the light emitter.

13. The beverage machine of claim 10, wherein the first and second portions are configured to emit and detect light that is oriented perpendicular to a conduit received by the opening.

14. The beverage machine of claim 10, wherein the body is configured as an elongated rectangular rod with the first and second portions at opposite ends of the rod and the opening near a center of the rod.

15. The beverage machine of claim 14, wherein the first and second portions each include a hole that extends from respective ends of the rod into the body and toward the opening, the hole for each of the first and second portions being configured to receive and frictionally engage with the light emitter and light detector, respectively.

16. A beverage machine comprising:

a liquid supply tank configured to hold a liquid for forming a beverage;

a heater configured to heat the liquid from the liquid supply tank;

a first conduit fluidly coupled to the liquid supply tank, and a second conduit fluidly coupled to and upstream of the heater, the second conduit being downstream of the first conduit;

a pump fluidly coupled between the first and second conduits, the pump configured to move liquid from the liquid supply tank to the heater;

a first sensor configured to detect liquid in the first conduit;

an optical sensor configured to detect liquid in the second conduit; and a controller coupled to at least one of the first sensor and the optical sensor and arranged to receive a signal from at least one of the first sensor and the optical sensor, wherein the controller is configured to prohibit at least some beverage machine functions when the at least one of the first sensor and the optical sensor detects absence of liquid at at least one of a level in the first conduit and a level in the second conduit, wherein the controller is arranged to prohibit activation of the pump when the at least one of the first sensor and the optical sensor detects absence of liquid at the at least one of the level in the first conduit and the level in the second conduit.

17. The beverage machine of claim 16, wherein the optical sensor includes a body made of a resilient material and including first and second portions and an opening located between the first and second portions, the opening configured to receive and frictionally engage with the second conduit, the first portion configured to support a light emitter to emit light toward the opening and through the second conduit engaged at the opening, and the second portion configured to support a light detector to detect light transmitted by the light emitter toward the opening.

18. The beverage machine of claim 16, wherein the first conduit is configured to deliver liquid from the liquid supply tank to the second conduit.

* * * * *